July 24, 1962  R. I. DINLOCKER  3,045,478
HORSEPOWER MEASURING SYSTEM
Filed Feb. 10, 1960
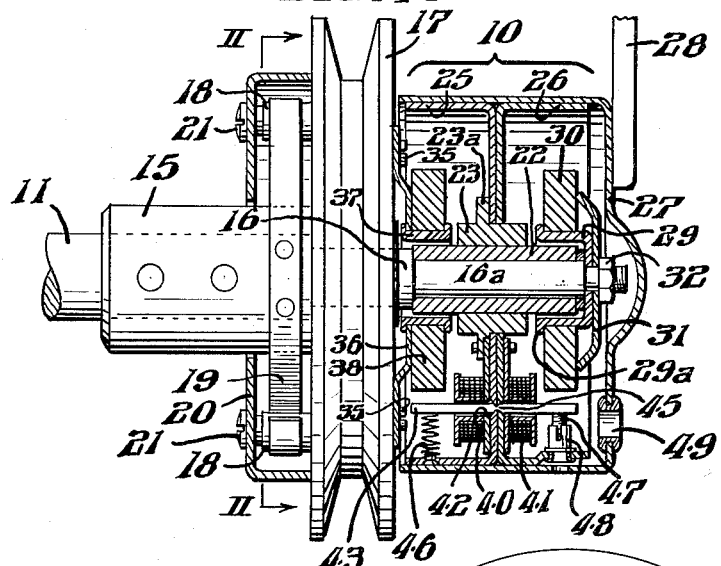
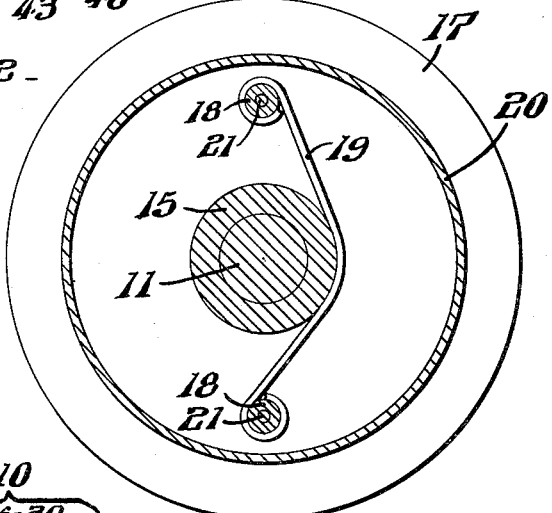
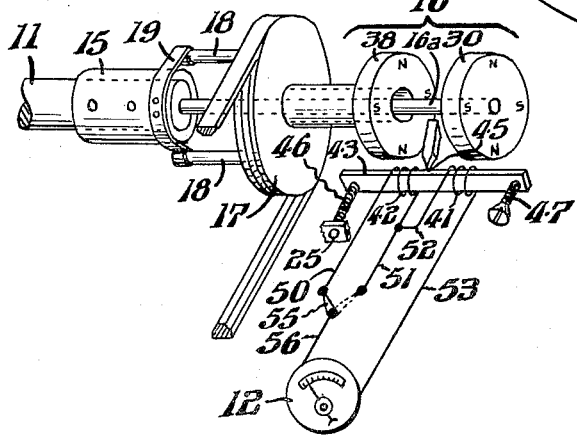
INVENTOR.
Robert I. Dinlocker,
BY
Paul & Paul
ATTORNEYS.

3,045,478
HORSEPOWER MEASURING SYSTEM
Robert I. Dinlocker, Lansdale, Pa., assignor to Electro-Mechanical Instrument Co., Perkasie, Pa., a corporation of Pennsylvania
Filed Feb. 10, 1960, Ser. No. 7,840
3 Claims. (Cl. 73—136)

This invention relates to horsepower measuring systems.

My invention has, for its chief aim, the provision of a simple and relatively inexpensive system for measuring the horsepower delivered, through transmission from a prime mover to an apparatus or a machine to be driven, in which electric current is generated by load reaction upon the transmission means, and the current so generated is utilized to actuate a direct-reading electrical metering instrument or recorder calibrated in increments of horsepower.

Other objects and attendant advantages will appear from the following detailed description of the attached drawings, wherein:

FIG. 1 is an axial view of a transducer forming a part of the system and constructed in accordance with my invention.

FIG. 2 is a cross section of the transducer taken as indicated by the angled arrows II—II in FIG. 1; and FIG. 3 is a diagrammatic perspective view of the system.

As herein exemplified, the horsepower measuring system of my invention comprises a current generating transducer which is comprehensively designated 10 and is adapted to be mounted on the shaft 11 of a prime mover such as an engine or a motor (not shown); and a direct-reading electrical metering instrument or recorder 12 (FIG. 3), in association with the transducer for measuring electric current strength transmitted thereto, said meter being calibrated in increments of horsepower.

From FIGS. 1 and 3 it will be noted that the transducer 10 is provided with a collar 15 which is pinned to the shaft 11 of the prime mover. Mounted upon the portion 16 of an extension of the shaft 11 is a wheel here exemplified as sheave 17 for belt connection to the drive shaft of an apparatus or machine (not shown). Projecting from one side of the sheave 17 is a pair of diametrally arranged studs 18 which are engaged by the opposite ends of a torsion spring 19 affixed to the collar 15. The spring 19 is enclosed in a cover 20 fashioned from suitably stiff sheet material and secured by screws 21 to the studs 18. The diametrically reduced end portion 16a of the shaft extension is surrounded by a sleeve 22 whereto is medially affixed a collar 23 having a circumferential flange 23a. Fixedly secured to the collar 23, in turn, are two-cup-shaped members 25 and 26 which are butted back to back; and fitting about said members is an outer shell or casing component 27 which is held against rotation with the shaft by a restraining arm 28. Engaged over the distal end of the shaft 16a is a small thimble-like element 29 whereon is mounted a permanent disk magnet 30 having poles arranged as in FIG. 3. The magnet 30 is held in place against the flange 29a of the thimble-like element 29 by a spring disk 31 which, together with said element, is secured against rotation relative to the shaft by a clamp nut 32, a compression washer being interposed between said element and the outer end of the sleeve 22. Fastened by screws 35 to the face of the wheel 17 opposite that occupied by the studs 18, is an axially-apertured circular plate 36 wherein is secured a small bushing 37 which surrounds the sleeve 22 with intervention of a substantial annular clearance, and whereon is fixedly mounted a disk magnet 38 identical with the magnet 30. Normally, the respective poles of the magnet 38 are in direct alignment with the corresponding poles of the magnet 30, as in FIG. 3. The radial webs of the cup-like members 25 and 26 of the casing 27 have eccentrically disposed registering apertures 40, and affixed to the outer sides of said webs in coaxial relation with each other and the apertures 40 are coils 41 and 42. Extending freely through the hollows of the coils 41 and 42 is a core element 43 in the form of a bar which is medially pivoted at 45 in the apertures 40, with opposite ends thereof overreaching the edges of the magnets 30 and 38. The bar 43 bears at one end upon a helical spring 46 and at its other end is supported by a screw 47 threadedly engaged in a bushing 48 set into the cup-like member 26, said screw being accessible for adjustment from the exterior through a hole in the casing shell 27. By this means the core bar 43 can be accurately positioned so that inequalities in the voltage induced in the two coils 41 and 42 due to manufacture discrepancies can be balanced out. The casing shell 27 is also provided with a grommeted hole 49 in the back thereof for passage of the leads 50, 51 and 52, 53 (FIG. 3) of the coils 41 and 42 to the exterior. As shown in FIG. 3, the leads 50, 51 of the coils 42 extend respectively to the terminals of a manual switch 55 which is connected to one terminal of the instrument 12 by a conductor 56. As further shown in FIG. 3, the lead 53 of the coil 41 is directly connected to the other terminal of the instrument 12, and the lead 52 to the lead 51 of coil 42 ahead of the switch 55. By virtue of this arrangement, it will be apparent that when switch 55 is thrown to the full line position in FIG. 3, the coils 41 and 42 will be in series with each other and with the instrument 12 whereas, when said switch is thrown to the broken line position, the coil 41 only will be in circuit with said instrument.

Operation

Assume that the switch 55 is in the full line position of FIG. 3. Normally, as the two magnets 30 and 38 are rotated in unison with corresponding poles thereof directly in line with each other and opposing, no flux will be passed through the core bar 43 and hence no current generated to affect the instrument 12. However, by load reaction upon the wheel 17, said wheel will be rotatively shifted about the shaft 11 in opposition to the force of the spring 19 (the extent of such shifting depending upon the degree of restraint imposed) with consequent corresponding rotative displacement of the magnet 38 relative to the magnet 30. As a consequence, flux will pass from one magnet to the other by way of the core piece 43 and thereby induce an alternating current in the coils 41 and 42, the current so generated being conducted through the leads 50 and 53 to the instrument 12. The system is thus capable of measuring the actual amount of energy a given load is receiving from a power source and of indicating or recording the extent of this energy in term of horsepower.

When the switch 55 is thrown to the broken line position in FIG. 3, the coil 42 will be cut out of service and the coil 41 only, permitted to function. Under this condition, the output voltage of the transducer will be proportional only to the rotative speed of the shaft 11, in which case the instrument 12 will serve as a meter to indicate or register speed variations of said shaft.

The transducer 10 is thus a self-generating device and does not require electrical energy from any other source. It can be made in any size to handle any amount of horsepower, subject only to practical design limitations, without changing the theoretical operating principle of the system. Based on the physical laws for mechanical energy, of which the c.g.s. unit horsepower is equal to 33,000 foot pounds per minute, the transducer generates a voltage in proportion to the product of speed of the pulley times the load imposed thereon, which are derivatives of the horsepower formula. The operation of the transducer is therefore such that it satisfies the horsepower formula by generating a voltage directly proportional to speed of the rotating shaft and attenuates this voltage inversely proportional to shaft torque. If no drag or load is imposed on the wheel 17, then maximum attenuation takes place and the output voltage is zero, corresponding to zero horsepower. Conversely, if an overload condition should cause the prime mover to stall out (cease turning) but still develop and exert full locked rotor torque through the transducer, then the attenuation will be completely eliminated and full voltage will be permitted to pass, but since the rotor magnets 30 and 38 have ceased to turn, no voltage will develop at the source and, therefore, the indication will once again be zero horsepower. In between these two extremes various combination of speed and torque will multiply together to furnish an output voltage equivalent to the actual amount of horsepower being conveyed through the system. The voltage generated in proportion to the speed of the shaft is based on well known principles of electricity, described in the Lens and Faraday laws. The novel feature of the system is the manner in which two generated alternating current voltages of the same frequency are caused to add, subtract or attenuate in direct proportion to shaft torque.

While in accordance with the provisions of the statutes, I have illustrated and described the best forms of embodiment of my invention now known to me, it will be apparent to those skilled in the art that changes may be made in the forms of the apparatus described without departing from the spirit and scope of the invention as set forth in the appended claims, and that in some cases certain features of my invention may be used to advantage without a corresponding use of other features.

Having thus described my invention, I claim:

1. In a horsepower measuring system, a current generating transducer comprising a wheel coaxially mounted on the shaft of a prime mover for transmitting power to an apparatus or a machine to be driven, said wheel being connected to the shaft by a torsion spring means, a permanent disk magnet coaxially affixed to the shaft, a similar permanent disk magnet coaxially affixed to said wheel adjacent the first mentioned magnet with the poles thereof normally opposite corresponding poles of said first mentioned magnet, a pair of axially aligned serially connected stationary coils non-concentrically disposed in an interval between the magnet, a core element in the form of a medially pivoted bar extending through the hollows of said coils means for adjusting said bar about its pivot, and an electrical measuring instrument in circuit with said coils operative, upon induction of current in the coils when the second mentioned magnet is turned relative to the first mentioned magnet by slight independent rotation of the wheel about the shaft against the force of the torsion spring means in response to load increase, to indicate such load in increments of horsepower.

2. The invention according to claim 1, further including a selective switch means whereby the two coils can be serially connected in circuit with the measuring instrument to indicate the load increase in increments of horsepower, or whereby one of said coils alone can be connected in circuit with said instrument to indicate the speed of the wheel attendant upon such load increase.

3. In a horsepower measuring system, a current generating transducer comprising a wheel mounted on the shaft of a prime mover for transmitting power to an apparatus or a machine to be driven, said wheel being connected to the shaft by a torsion spring means, a permanent disk magnet affixed in coaxial relation to the shaft, a similar permanent disk magnet coaxially affixed to said wheel adjacent the first mentioned magnet with the poles thereof normally opposite corresponding poles of said first mentioned magnet, a pair of axially aligned serially connected coils stationarily disposed in the interval between the magnets, a casing in which the magnets are enclosed mounted on the shaft but restrained against rotation therewith, and a core element in the form of a bar medially pivoted in the casing and extending through the hollows of the coils with the ends thereof respectively over-reaching the edges of the two magnets, a spring on which one end of the bar rests, an adjusting screw threadedly engaged in the casing on which the other end of the bar rests, an electrical measuring instrument in circuit with said coils and operative, upon induction of current in the coils when the second mentioned magnet is turned relative to the first mentioned magnet by slight independent rotation of the wheel about the shaft against the force of the torsion spring means in response to increase in the load upon the wheel, to indicate the load increase in increments of horsepower.

References Cited in the file of this patent

UNITED STATES PATENTS

| | | |
|---|---|---|
| 2,306,361 | Stuart | Dec. 22, 1942 |
| 2,563,425 | Schaevitz | Aug. 7, 1951 |
| 2,582,145 | Moore | Jan. 8, 1952 |
| 2,753,475 | Curl | July 3, 1956 |

FOREIGN PATENTS

| | | |
|---|---|---|
| 890,613 | France | Nov. 8, 1943 |
| 559,116 | Great Britain | Feb. 4, 1944 |